(12) United States Patent
Hashimoto et al.

(10) Patent No.: US 7,073,327 B2
(45) Date of Patent: Jul. 11, 2006

(54) EXHAUST EMISSION CONTROL SYSTEM, METHOD OF CALCULATING PRESSURE LOSS OF FILTER, AND METHOD OF MANUFACTURING FILTER

(75) Inventors: Shigeharu Hashimoto, Okazaki (JP); Yukio Miyairi, Nagoya (JP); Tadato Ito, Nagoya (JP)

(73) Assignee: NGK Insulators, Ltd., Nagoya (JP)

(*) Notice: Subject to any disclaimer, the term of this patent is extended or adjusted under 35 U.S.C. 154(b) by 0 days.

(21) Appl. No.: 10/505,318

(22) PCT Filed: Feb. 28, 2003

(86) PCT No.: PCT/JP03/02378

§ 371 (c)(1),
(2), (4) Date: Mar. 2, 2005

(87) PCT Pub. No.: WO03/074847

PCT Pub. Date: Sep. 12, 2003

(65) Prior Publication Data

US 2005/0138921 A1 Jun. 30, 2005

(30) Foreign Application Priority Data

Mar. 1, 2002 (JP) .............................. 2002-056051

(51) Int. Cl.
*F01N 3/00* (2006.01)

(52) U.S. Cl. ............................ 60/297; 60/274; 60/285; 60/286; 60/295; 60/311; 55/DIG. 30

(58) Field of Classification Search ................. 60/274, 60/286, 295, 297, 303, 311; 55/DIG. 30
See application file for complete search history.

(56) References Cited

U.S. PATENT DOCUMENTS 4,417,908 A * 11/1983 Pitcher, Jr. .................... 55/523

(Continued)

FOREIGN PATENT DOCUMENTS

EP 1 101 910 A2 5/2001

(Continued)

*Primary Examiner*—Thomas Denion
*Assistant Examiner*—Diem Tran
(74) *Attorney, Agent, or Firm*—Oliff & Berridge, PLC

(57) ABSTRACT

There are disclosed an exhaust emission control system including an internal combustion engine, a filter, and an exhaust pipe, a method of manufacturing a filter suitable for the system, and a method of calculating a pressure loss. The system comprises combustion means for intermittently burning particulate matters arrested by the filter, the filter includes porous partition walls extending from one end face to the other end face thereof, and a large number of through channels partitioned by the partition walls, predetermined through channels are sealed at either of the end faces, and assuming that a partition wall thickness is (X) μm, and the number of through channels per unit area in a cross section vertical to a longitudinal direction of the through channels is (Y) cells/cm², X and Y come within a range surrounded by straight lines connecting points A1, B1, C1, and D1 in this order in FIG. 1 in the exhaust emission control system. There are provided the exhaust emission control system, the method of manufacturing the filter, and the method of calculating the pressure loss by the filter with good accuracy in which a temperature gradient produced in the filter at the time of regeneration is suppressed while suppressing a rise of the pressure loss by the filter and which are accordingly superior in reliability.

14 Claims, 8 Drawing Sheets

U.S. PATENT DOCUMENTS 4,462,208 A * 7/1984 Hicks et al. .................. 60/286
5,193,340 A * 3/1993 Kamihara .................... 60/286
5,296,198 A    3/1994 Abe et al.

FOREIGN PATENT DOCUMENTS

| JP | A 7-163822 | 6/1995 |
| JP | A 09-222009 | 8/1997 |
| JP | A 2001-200715 | 7/2001 |
| JP | A 2003-49633 | 2/2003 |
| WO | WO 01/28658 A1 | 4/2001 |
| WO | WO 02/12687 A1 | 2/2002 |

* cited by examiner 1.5mm

| POROSITY : 46% |
| AVERAGE PORE DIAMETER : 18μm |
| THERMAL CONDUCTIVITY : 25W/mk |

EXHAUST EMISSION CONTROL SYSTEM, METHOD OF CALCULATING PRESSURE LOSS OF FILTER, AND METHOD OF MANUFACTURING FILTER

TECHNICAL FIELD

The present invention relates to an exhaust emission control system, a method of calculating a pressure loss by a filter, and a method of manufacturing a filter, particularly to an exhaust emission control system in which a pressure loss is small and a temperature gradient generated in a filter at the time of combustion is small, a calculation method capable of calculating a pressure loss by a filter in an exhaust emission control system with good accuracy, and a method of manufacturing a filter, in which an appropriate filter shape can be easily determined.

BACKGROUND ART

As a conventional exhaust emission control system for efficiently removing particulate matters (hereinafter referred to as PM) exhausted from an internal combustion engine, a system using a diesel particulate filter (hereinafter referred to as DPF) has heretofore been proposed. Unless the captured PM is removed in the system using the DPF, the filter is finally clogged, and therefore the filter needs to be periodically regenerated.

In general, the regeneration of the filter is possible, when the DPF is heated and burnt. However, for example, an exhaust gas temperature of a diesel engine does not easily reach to a burning temperature of the PM. Therefore, there has been considered a method in which the temperature of the DPF is raised by external heat sources such as an electric heater and a burner to burn soot that is a main component of the PM, or a method in which the DPF is periodically replaced, and the removed DPF is heated by an electric furnace.

However, in the method in which the filter is heated by the external heat sources such as the electric heater and the burner, the PM deposited on the filter can be comparatively stably burnt, but the electric heater or the combustion burner is a complicated/expensive device, and therefore this method has been restricted to some special applications. In the method in which the DPF is periodically replaced, handling of the filter has been troublesome.

To solve the problem, there has been proposed a system in which a time to supply fuel to an internal combustion engine, for example, a fuel injection time in a diesel engine or the like is adjusted to raise an exhaust gas temperature, and the PM deposited on the filter is periodically burnt. This system is sometimes combined with a method for lowering the burning temperature of the PM in order to more sufficiently burn the PM. Since the method is a comparatively simple method, it has also been possible to mount an exhaust emission control system in which the DPF is used in removing the PM exhausted from the diesel engine mounted on the automobile.

However, in the method in which the PM is deposited on the filter, and the injection time of the diesel engine is adjusted at a certain time interval to raise the exhaust gas temperature, the exhaust gas temperature rises in a remarkably short time. Therefore, as compared with the case where the PM is burnt by the electric furnace or the like, a rapid temperature rise in the filter at the time of regeneration easily occurs, additionally a temperature gradient in the filter increases, and there has been a possibility that the filter is disadvantageously cracked. Especially in the method for lowering the burning temperature of the PM, activation energy of the PM is lowered. Therefore, as compared with a case where the PM is simply burnt by the exhaust gas temperature rise from the engine, the PM is burnt in a comparatively short time, thermal energy received by the DPF per unit time increases, an excessive temperature distribution is made in the DPF, and there has been a possibility that the DPF is more easily cracked or that materials are molten.

On the other hand, the filter has a mechanism in which openings of cells of a honeycomb structure constituted of a porous ceramic are alternately sealed, and the PM is captured during passing of the exhaust gas through porous honeycomb walls. During the passing of the exhaust gas through the walls, emission resistance is generated, and there is a problem that a difference in pressure loss before/after the filter increases. When the pressure difference increases, an output from the engine drops. Therefore, to obtain the same performance, as compared with a case where the filter is not mounted, much more fuel is required. When the pressure difference excessively increases, there is a possibility that the fuel does not burn well in the engine and the engine does not operate disadvantageously. Therefore, it is an important function of the filter to reduce the pressure loss difference before/after the filter.

Moreover, when a fuel auxiliary agent is used for lowering the burning temperature of the PM, and when the fuel auxiliary agent burns together with the PM, a large amount of ashes are generated, and there is a problem that a back pressure before/after the filter increases. Even in a method in which a catalyst is imparted to the filter, the catalyst itself or a washed coating of the catalyst closes pores in the filter, and therefore there is a problem that the pressure loss in the filter increases. Therefore, in the exhaust emission control system, it has been necessary to suppress the increase of the pressure loss to the utmost while well suppressing a filter temperature at the time of regeneration.

On the other hand, various methods of calculation of the pressure loss of the filter have heretofore been proposed, but the pressure loss can be calculated well on conditions that any PM is not deposited on the filter, but it has not been possible to calculate the pressure loss in a case where the PM is deposited. Therefore, since it is difficult to calculate the pressure loss of the filter at the time of actual use in the exhaust emission control system with good accuracy, it is difficult to predict an optimum filter structure in which the pressure loss is well balanced with the filter temperature at the time of regeneration. There has been a demand for a method of calculating the pressure loss with good accuracy in order to obtain the exhaust emission control system provided with the above-described optimum filter.

DISCLOSURE OF THE INVENTION

The present invention has been developed in consideration of circumstances, and an object is to provide an exhaust emission control system in which a rise of a pressure loss by a filter is suppressed while suppressing a temperature gradient generated in the filter at the time of regeneration and which is accordingly superior in reliability. Another object of the present invention is to provide a method of measuring a pressure loss by a filter with good accuracy. Still another object of the present invention is to provide a method of manufacturing a filter, capable of easily determining an appropriate shape of the filter preferably usable in the above-described exhaust emission control system.

According to the present invention, there is first provided an exhaust emission control system including: an internal combustion engine; a filter for capturing particulate matters in an exhaust gas exhausted from the internal combustion engine; and an exhaust pipe for introducing the exhaust gas into the filter, the system comprising a combustion means or device for intermittently burning the particulate matters captured by the filter, the filter being a honeycomb filter including: at least two end faces; porous partition walls extending from one end face to the other end face; and a large number of through channels partitioned by the partition walls and extending from one end face through the other end face, predetermined through channels being sealed in one end face, remaining predetermined through channels being sealed in the other end face, wherein assuming that a partition wall thickness is (X) μm, and the number of through channels per unit area in a section vertical to a longitudinal direction of the through channels is (Y) cells/cm$^2$, X and Y fall within a range surrounded by straight lines connecting points A1 (X is 267, Y is 50.4), B1 (X is 343, Y is 27.1), C1 (X is 470, Y is 27.1), and D1 (X is 394, Y is 50.4) in this order in FIG. 1.

In the first aspect of the present invention, the X and Y preferably fall within a range surrounded by straight lines connecting points A2 (X is 305, Y is 46.5), B2 (X is 356, Y is 31.0), C2 (X is 432, Y is 31.0), and D2 (X is 381, Y is 46.5) in this order in FIG. 1, and the X and Y further preferably fall within a range surrounded by straight lines connecting points A3 (X is 330, Y is 42.7), B3 (X is 356, Y is 34.9), C3 (X is 406, Y is 34.9), and D3 (X is 381, Y is 42.7) in this order in FIG. 1. The internal combustion engine is preferably a diesel engine. The combustion means or device preferably includes an exhaust gas temperature raising means or device for raising a temperature of the exhaust gas in such a manner as to start the burning of the particulate matters captured by the filter, and the exhaust gas temperature raising means or device further preferably includes an adjustment device for adjusting a time to supply fuel to the internal combustion engine. The exhaust gas temperature raising means or device also preferably includes a supply device for supplying the fuel into the exhaust pipe. The exhaust emission control system preferably further includes a means or device for lowering the burning temperature of the particulate matters captured by the filter, and the exhaust emission control system also preferably includes a means, matter, or device for promoting the burning of the particulate matters captured by the filter. The filter preferably contains a ceramic material as a main component, and the filter is also preferably constituted of a plurality of integrated segments of a honeycomb structure.

According to the present invention, there is secondly provided a method of calculating a pressure loss of a honeycomb filter including: at least two end faces; porous partition walls extending from one end face to the other end face; and a large number of through channels partitioned by the partition walls and extending from one end face through the other end face, predetermined through channels being plugged in one end face, remaining predetermined through channels being plugged in the other end face, the method comprising the steps of: decomposing the pressure loss into at least a pressure loss in a plugged portion, a pressure loss in the through channel, and a pressure loss in the partition wall; and decomposing the pressure loss in the partition wall into pressure losses in cases where any particulate matter is not deposited in the filter and where the particulate matters are deposited to calculate the pressure loss. In the second aspect of the present invention, the method preferably comprises the steps of: measuring the pressure loss in the case where the particulate matters are deposited in the predetermined filter; and calculating the pressure loss in the partition wall in the case where the particulate matters are deposited in the filter based on an equation obtained by curve fitting of an increase behavior of the obtained pressure loss.

According to the present invention, there is thirdly provided a method of manufacturing a filter, wherein a shape of the filter is determined by use of a pressure loss value obtained by the calculation method according to the second aspect of the present invention.

BRIEF DESCRIPTION OF THE DRAWINGS

FIG. 2(a) is a perspective view.

BEST MODE FOR CARRYING OUT THE INVENTION

An exhaust emission control system according to a first aspect of the present invention, a method of calculating a pressure loss by a filter in the exhaust emission control system according to a second aspect, and a method of manufacturing a filter according to a third aspect will be described hereinafter with reference to the drawings, but the present invention is not limited to the following embodiment. It is to be noted that in the following, a section means a section vertical to a longitudinal direction (X-axis direction in FIG. 2(a)) of a through channel unless otherwise mentioned.

First, a method of calculating a pressure loss of a filter according to the second aspect of the present invention will be described.

Figure 2A:
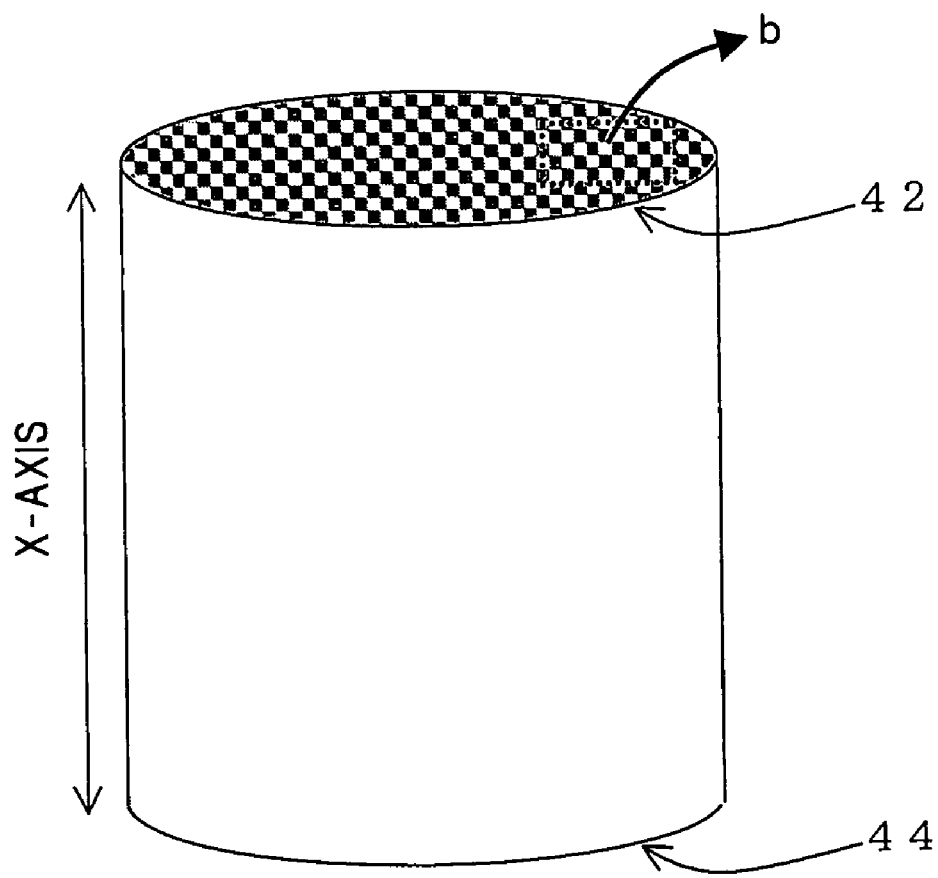
FIGS. 2(a) and (b) are diagrams schematically showing one configuration of the filter according to the present invention.
Figure 2B:
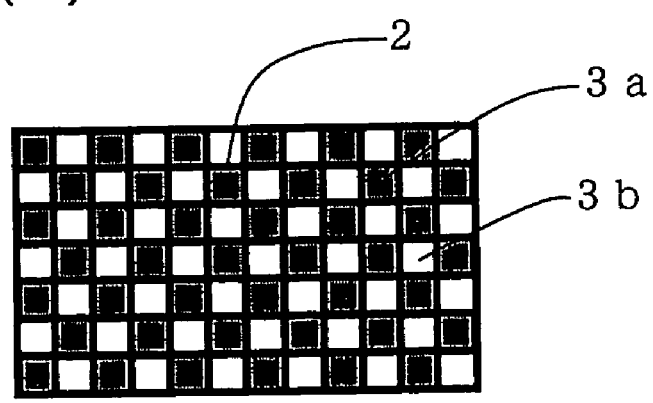
FIG. 2(b) is a partially enlarged view.

In an example of the filter according to the second aspect of the present invention, as shown in FIGS. 2(a), (b), the filter includes at least two end faces 42 and 44, porous partition walls 2 extending from one end face 42 to the other end face 44, and through channels 3a and 3b partitioned by the partition walls 2 and extending from one end face 42 through the other end face 44. The predetermined through channels 3a are plugged in one end face 42, and the remaining predetermined through channels 3b are plugged in the other end face 44 (not shown).

Figure 3:
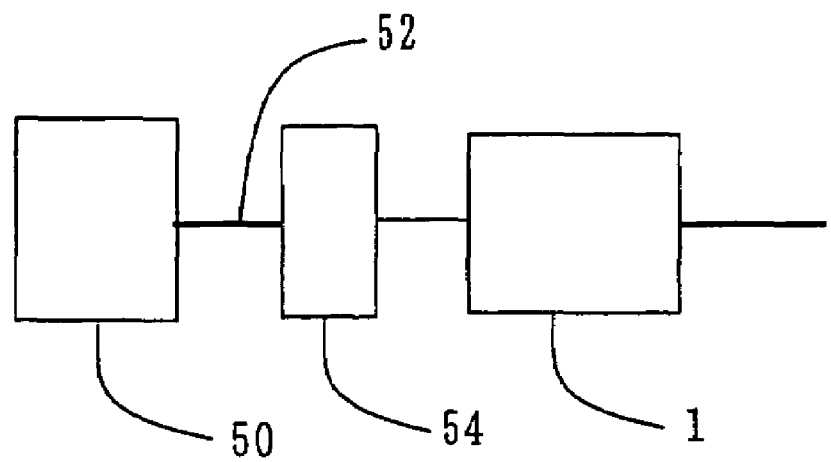
FIG. 3 is a diagram schematically showing a constitution of an exhaust emission control system according to the present invention.

In this constitution, when the filter is used as a filter 1 for purifying an exhaust gas from an internal combustion engine 50 as shown in FIG. 3, and, for example, when the exhaust gas is allowed to flow into the end face 42, the exhaust gas flows into the filter from the through channels 3b opened in the end face 42, passes through the porous partition walls 2, and is exhausted from the through channels 3a opened in the end face 44. In this case, the partition walls 2 function as the filter, and, for example, the PM and the like exhausted from a diesel engine can be captured and removed in the filter.

According to the second aspect of the present invention, there is provided a method of calculating a pressure loss at a time when the exhaust gas passes through the above-described filter. The pressure loss is decomposed into at least a pressure loss in a plugged portion (hereinafter referred to as the plugging pressure loss), a pressure loss in the through channel (hereinafter referred to as the in-channel pressure loss), and a pressure loss during passage of the gas through the partition walls (hereinafter referred to as the wall passage pressure loss), and the wall passage pressure loss is decomposed into a pressure loss in a case where any PM is not deposited in the filter (hereinafter referred to as the initial wall passage pressure loss) and a pressure loss in a case where the PM is deposited (hereinafter referred to as the PM pressure loss) to calculate the pressure loss, which is regarded as important characteristics. When the pressure loss is decomposed into factors as described above, and constants in a pressure loss theoretical formula are experimentally obtained with respect to the respective factors, the pressure loss of the filter at the time of actual use can be calculated with good accuracy.

The pressure loss by the filter in the exhaust emission control system is decomposed as described above, and can accordingly be represented by Equation (1).

$$\Delta P = \Delta Pm + \Delta Pc + \Delta Pwc + \Delta Pws \quad (1)$$

In the Equation (1), $\Delta P$ denotes a value of the pressure loss by the filter, $\Delta Pm$ denotes a value of the plugging pressure loss, $\Delta Pc$ denotes a value of the in-channel pressure loss, $\Delta Pwc$ denotes a value of the initial wall passage pressure loss, and $\Delta Pws$ denotes a value of the PM pressure loss, respectively.

Figure 4:
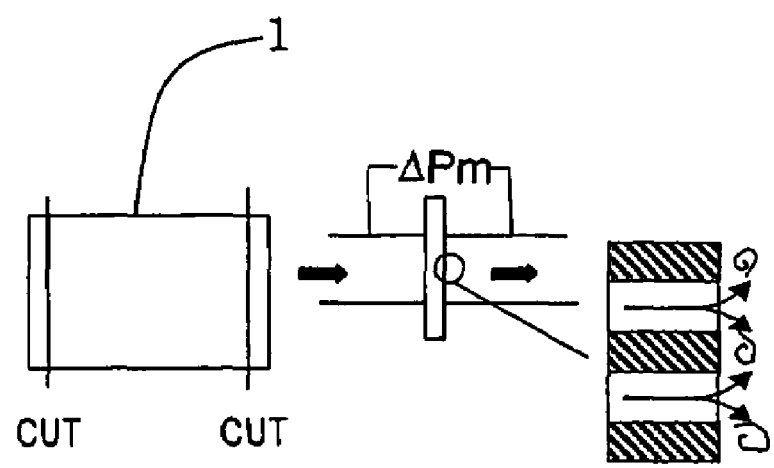
FIG. 4 is a diagram schematically showing a method of measuring a plugging pressure loss of the filter according to the present invention.

The plugging pressure loss is considered to be caused by contraction and expansion accompanying a change of a flow path sectional area of an exhaust gas in a plugged portion, and can be obtained, when the plugged portions in the filter 1 are cut from the filter 1 as shown in FIG. 4, and the pressure loss of only the plugged portion is measured. The pressure loss can be measured at various flow rates with respect to the filters having various partition wall thicknesses and any number of through channels per unit section area (hereinafter referred to as the cell density). The plugging pressure loss can be represented by Equations (2), (3) using a pressure coefficient $\xi$ which can be obtained from experiments.

$$\Delta Pm = \xi \rho v^\alpha \quad (2)$$

$$\xi = C_1 (1 - OFA)^{D1} \quad (3)$$

In the Equation (2), $\rho$ denotes a density of the exhaust gas, v denotes a flow rate of the exhaust gas, and $\alpha$ denotes an index which can be experimentally obtained. In the Equation (3), $C_1$, D1 denote a coefficient and an index which can be experimentally obtained, and OFA denotes an opening area ratio of the through channels to a total area.

Since the exhaust gas is considered to constitute a laminar flow when passing through the through channels, $\Delta Pc$ is generally proportional to viscosity, rate, and flow length of the exhaust gas, inversely proportional to square of a hydraulic diameter, and can be represented by Equation (4). The in-channel pressure loss can be measured using a honeycomb structure which does not include any plugged portion.

$$\Delta Pc = C_2 v^m L \mu / (OFA) / (DH)^2 \quad (4)$$

In Equation (4), $C_2$ and m denote a coefficient and an index which can be obtained by the experiments, respectively, v denotes the flow rate of the exhaust gas, $\mu$ denotes the viscosity of the exhaust gas, L denotes a length of the through channel, OFA denotes the opening area ratio of the through channels to the total area, and DH denotes the hydraulic diameter.

Figure 5:
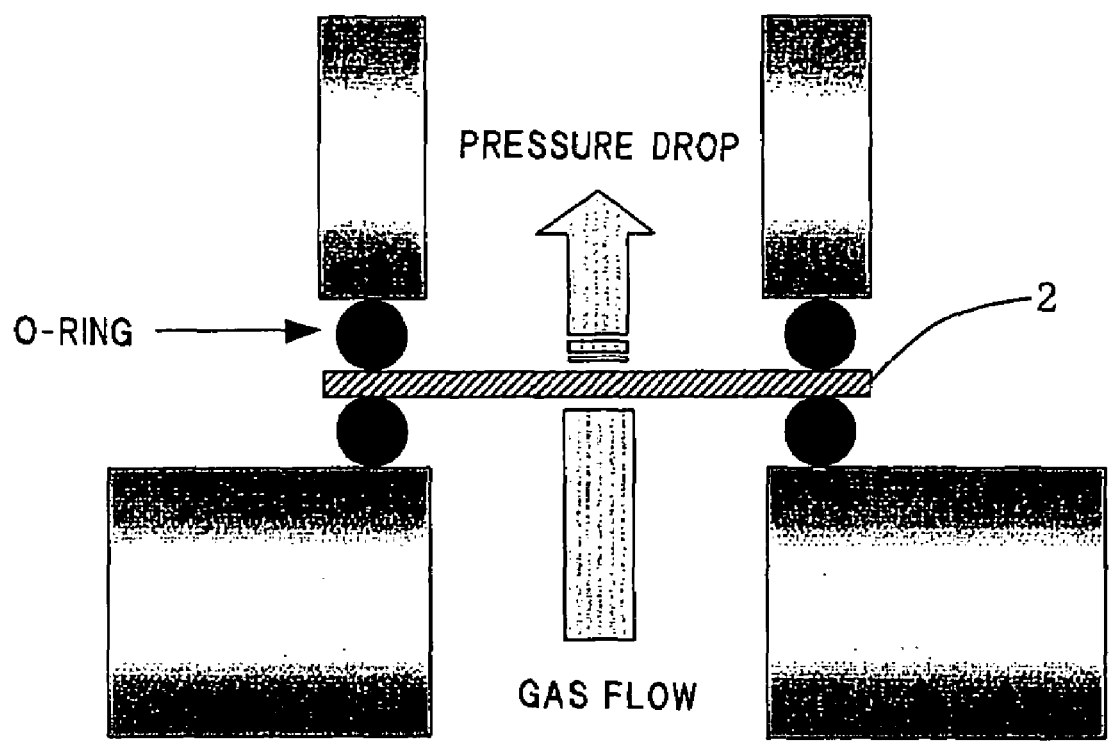
FIG. 5 is a diagram schematically showing a method of measuring a wall passage pressure loss according to the present invention.
Figure 6:
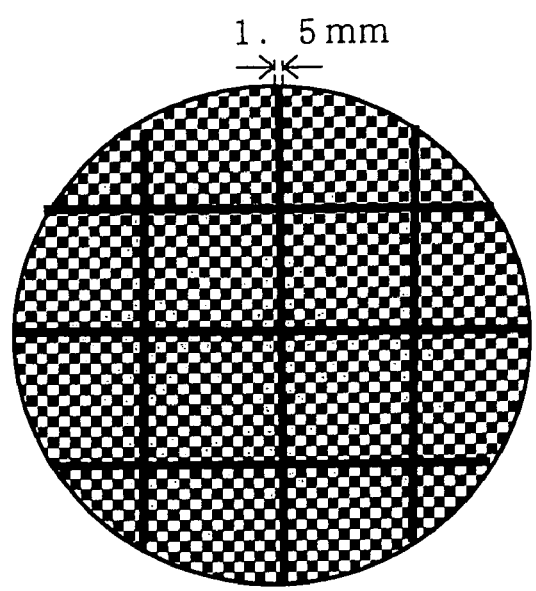
FIG. 6 is a schematic plan view showing another configuration of the filter according to the present invention.

It is considered that Darcy's law can be applied to the wall passage pressure loss. A degree of gas transmission of only the partition wall in a state in which any PM is not deposited can be measured, when the partition wall 2 is set onto a device shown in FIG. 5, and the degree can be represented by Equation (5).

$$\text{(Degree of gas transmission)} = \{(\text{flow rate of gas}) \times (\text{partition wall thickness}) \times (\text{viscosity of gas})\} / (\text{pressure loss}) \quad (5)$$

Here, for example, when a relation between a PM deposited amount per unit filter area of the partition wall in the DPF and the pressure loss of the whole DPF is measured, and an obtained increase behavior of the pressure loss is curve-fitted as a function of a deposited ratio of the PM, a relation between the increase of the pressure loss and the deposited amount of the PM can be obtained. Here, a curve-fitting method is not especially restricted, and a general method of recurrent analysis can be used. Moreover, the pressure loss at a time when the gas passes through the partition wall and a PM deposited layer can be represented by Equation (6).

$$\Delta Pw = \Delta Pwc + \Delta Pws \quad (6)$$

$$= (t_0/k_0) u \mu + f(t_p) u \mu / (u_0 \mu_0)$$

In the Equation (6), $$1/(u_0 \mu_0) = 6.3 \times 10^6,$$

k denotes an apparent degree ($m^2$) of gas transmission at the time when the gas passes through the partition wall and the PM layer, t denotes a total thickness (m) of the partition wall and the PM layer deposited on the partition wall, $t_p$ denotes an apparent PM layer thickness (m), $k_0$ denotes the degree ($m^2$) of gas transmission of only the partition wall;

$t_0$ denotes a partition wall thickness (m), u denotes a flow rate (m/s) of the gas which passes through the partition wall, $\mu$ denotes a viscosity (Pas) of the gas $u_0$ denotes a standard flow rate (m/s) of the gas, $\mu_0$ denotes a viscosity (Pas) of the gas in a standard state; and $f(t_p)$ denotes an increase of the pressure loss accompanying the increase of the deposited amount of the PM under conditions of $\mu_0$ and $u_0$, respectively.

In the second aspect of the present invention, the pressure loss is not attributed to the filter itself, but the pressure loss attributed to the exhaust pipe connected to the filter is also preferably taken into consideration. The pressure loss is considered to be caused by the contraction and expansion of the exhaust gas, and can be represented by Equation (7).

$$\Delta Pd = 2\rho v_1^2 (1 - d_1^2/D^2)^2 \quad (7)$$

In Equation (7), $\rho$ denotes the viscosity of the gas, $v_1$ denotes the exhaust gas flow rate (m/s) in the exhaust pipe, $d_1$ denotes a diameter (m) of the exhaust pipe, and $D$ denotes a diameter (m) of the filter, respectively.

When the pressure loss is taken into consideration, the pressure loss attributed to the filter can be represented by Equation (8).

$$\Delta P(\text{including the exhaust pipe}) = \Delta P \quad (8)$$
$$= \Delta Pm + \Delta Pc + \Delta Pwc +$$
$$\Delta Pws + \Delta Pd$$

Figure 7:
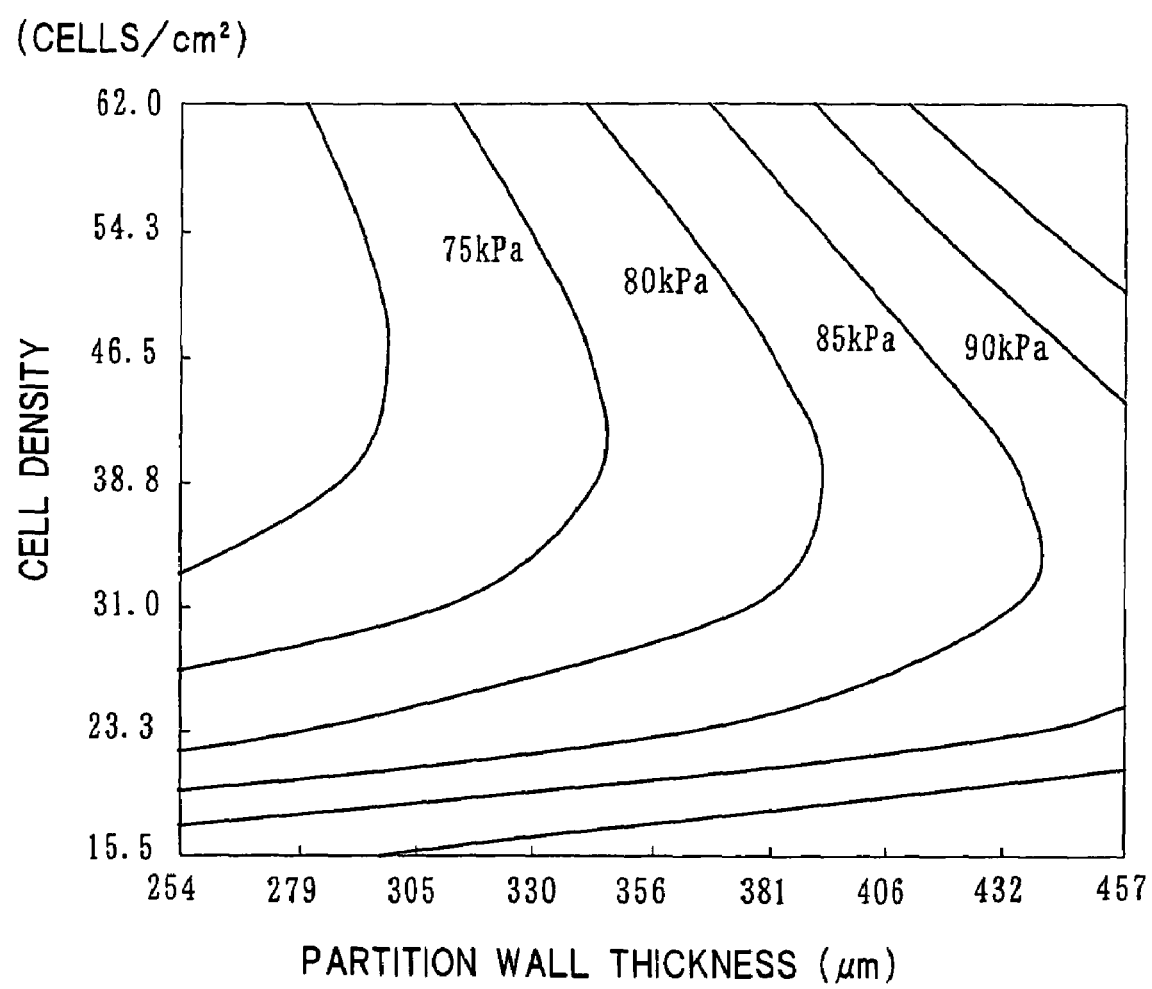
FIG. 7 is a graph showing results obtained by a method of calculating a pressure loss according to the present invention.

When the pressure loss by the filter is decomposed into at least four factors, further the pressure loss by the exhaust pipe connected to the filter is preferably added, and the coefficients are derived from the respective experimental results, the pressure loss by the filter can be calculated with better accuracy. In accordance with an example of Filter A in which segments each having a basic sectional shape of a 35 mm×35 mm square are integrated to form a cylindrical shape having a diameter of 144 mm×a length of 245 mm and which has the following filter characteristics, a relation among the pressure loss, the cell density, and the partition wall thickness is calculated on the following calculation conditions based on Equation (8) and is shown in FIG. 7.

(Characteristics of Filter A)
Material: silicon carbide
Porosity: 46%
Average pore diameter: 18 µm
Thermal conductivity: 25 W/mK
(Calculation Conditions)
PM deposited amount per unit volume of the filter: 5 kg/m$^3$
Exhaust gas flow rate: 10 Nm$^3$/min.
Temperature: 665° C.

It has heretofore been considered that the pressure loss uniquely drops, when the cell density is increased in order to increase a filter area. However, by this analysis, it has been found that with the equal partition wall thickness, a pressure loss value is minimized in the vicinity of a cell density of about 39 cells/cm$^2$, and the pressure loss increases, when the cell density is not less than the value. This is considered to be attributed to the increase of the in-channel pressure loss by a decrease of the hydraulic diameter. It has also been confirmed that the smaller the partition wall thickness is, the wall passage pressure loss drops.

Next, a method of manufacturing a filter according to a third aspect of the present invention will be described. According to the second aspect of the present invention, the pressure loss in the case where the PM is deposited can be calculated with respect to the filter having the predetermined material and characteristics. Moreover, the derived pressure loss indicates a minimum value with a specific cell density in a predetermined partition wall thickness as shown in FIG. 7. Therefore, during the manufacturing of the filter, the partition wall thickness and the cell density can be determined in an appropriate range in which the pressure loss drops based on the value of the pressure loss calculated with respect to the filter having the specific material and shape. The cell density and the partition wall thickness may be determined beforehand, and the material and the specific characteristics of the filter may also be determined based on the calculated value of the pressure loss.

In the third aspect of the present invention, the shape of the filter is preferably determined in consideration of the reduction of the temperature gradient in the filter. For example, in an example of DPF, the temperature rise and the temperature gradient in the DPF by the burning of the PM at the time of regeneration depend on a thermal capacity of the DPF. Therefore, when the partition wall thickness and the cell density are set to appropriate values, an excessive rise of temperature in the DPF can be prevented, and the temperature gradient in the DPF can be reduced. The relation among the partition wall thickness, the cell density, and the temperature gradient in the filter can be measured, for example, when the DPFs having various partition wall thicknesses and cell densities are prepared, and actually attached to the exhaust pipe of the diesel engine. In this case, when a predetermined amount of PM is deposited, the exhaust gas temperature is raised to burn the PM deposited in the DPF.

When the partition wall thickness and the cell density in appropriate ranges with respect to the pressure loss, preferably further the partition wall thickness and the cell density in appropriate ranges with respect to the temperature gradient are derived, the partition wall thickness and the cell density in optimum ranges with respect to both the pressure loss and the temperature gradient can be derived. For example, a filter having the partition wall thickness and the cell density in the optimum ranges can be manufactured which is usable in the exhaust emission control system according to the first aspect of the present invention.

Next, the exhaust emission control system according to the first aspect of the present invention will be described.

The exhaust emission control system of the first aspect is a system including: an internal combustion engine 50; a filter 1 which captures PM in an exhaust gas exhausted from the internal combustion engine 50; and an exhaust pipe 52 which introduces the exhaust gas exhausted from the internal combustion engine 50 into the filter 1 as shown in FIG. 3. The system further includes a combustion means or device which intermittently burns the PM captured by the filter. Moreover, as shown in FIGS. 2(a), (b), the filter 1 includes at least two end faces 42 and 44, porous partition walls 2 extending from one end face 42 to the other end face 44, and through channels 3a and 3b partitioned by the partition walls 2 and extending from one end face 42 through the other end face 44, the predetermined through channels 3a are plugged in one end face 42, and the remaining predetermined through channels 3b are plugged in the other end face 44 (not shown).

An oxidation catalyst 54 is preferably disposed in a stage before the filter for a purpose of burning unburned carbohydrate and carbon monoxide exhausted in a diesel exhaust gas in the stage before the filter. When the oxidation catalyst is disposed, and when, for example, a fuel injection time is adjusted to raise the exhaust gas temperature, unburned contents (carbohydrate, carbon monoxide, etc.) in the exhaust gas burn by this oxidation catalyst, and a reaction heat is produced. Therefore, the catalyst is advantageously disposed, but this is not an essential requirement for the first aspect of the present invention, and the catalyst does not have to be especially disposed.

By this constitution, the exhaust gas flowing into the filter from the internal combustion engine flows into the through channels $3b$ opened in the end face 42, passes through the porous partition walls 2, and is exhausted from the through channels $3a$ opened in the end face 44. In this case, the partition walls 2 constitute the filter, the PM and the like exhausted, for example, from the diesel engine can be captured and removed in the filter, the captured PM is intermittently burned by the combustion means or device, and the filter can be periodically regenerated.

Figure 1:
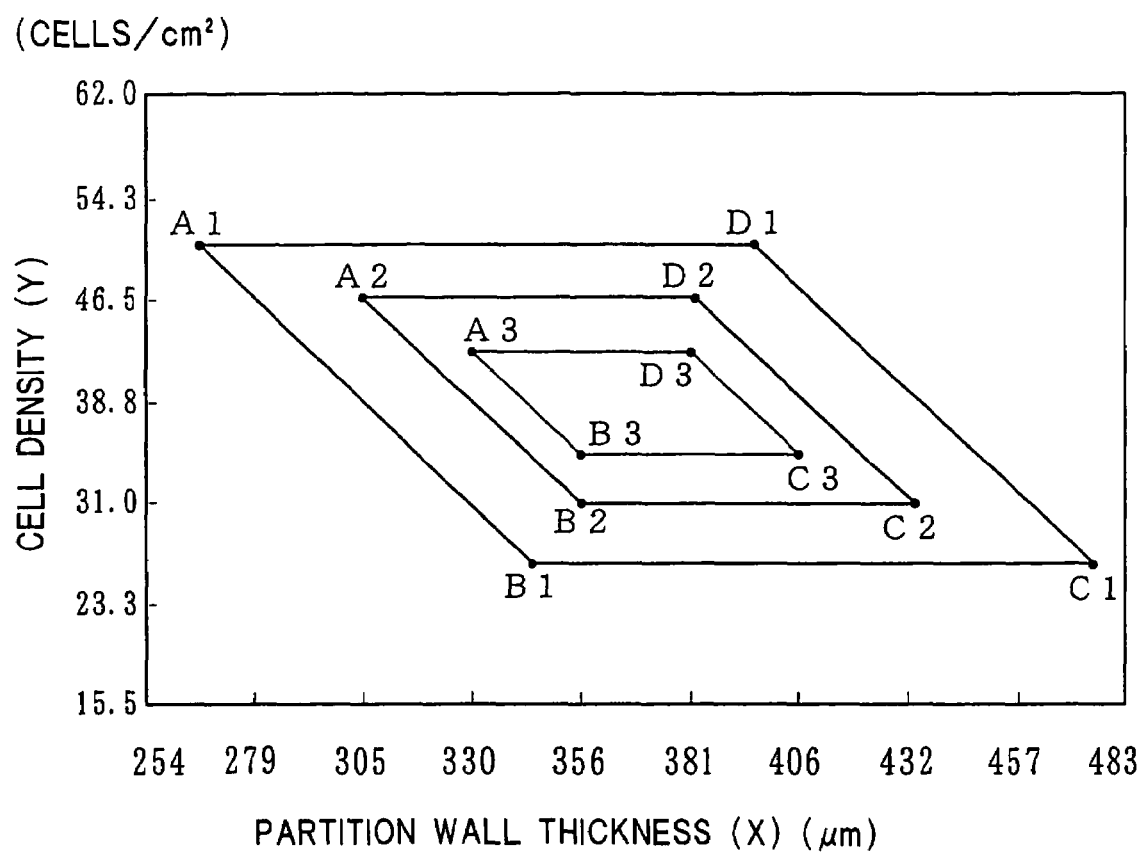
FIG. 1 is a graph showing ranges of a partition wall thickness and a cell density in a filter according to the present invention.

In important characteristics of the first aspect of the present invention, assuming that a partition wall thickness is (X) μm, and the cell density is (Y) cells/cm$^2$, X and Y fall: within a range of straight lines connecting points A1 (X is 267, Y is 50.4), B1 (X is 343, Y is 27.1), C1 (X is 470, Y is 27.1), and D1 (X is 394, Y is 50.4) in this order in FIG. 1; preferably within a range surrounded by straight lines connecting points A2 (X is 305, Y is 46.5), B2 (X is 356, Y is 31.0), C2 (X is 432, Y is 31.0), and D2 (X is 381, Y is 46.5) in this order in FIG. 1; and further preferably within a range surrounded by straight lines connecting points A3 (X is 330, Y is 42.7), B3 (X is 356, Y is 34.9), C3 (X is 406, Y is 34.9), and D3 (X is 381, Y is 42.7) in this order in FIG. 1.

This range is a range obtained by calculating the pressure loss according to the second aspect of the present invention, determining the cell density and the partition wall thickness in the appropriate ranges in which the pressure loss is reduced according to the third aspect, and further considering that a maximum temperature gradient in the filter be reduced. With the partition wall thickness and the cell density falling in this range, an exhaust emission control system can be achieved in which the pressure loss is small and the temperature gradient in the filter generated at the time of the burning of the PM captured by the filter is small.

As described above, the larger the partition wall thickness is and the larger the cell density is, the temperature gradient is reduced. With respect to the pressure loss, the cell density has a relation with a filter area. The larger the cell density is, the filter area increases, and the pressure loss can be reduced. The partition wall thickness also influences the pressure loss at a time when the gas passes through the partition walls. The smaller the partition wall thickness is, the pressure loss is reduced. In this manner, the partition wall thickness and the cell density have complicated influences on the pressure loss and the temperature behavior at the time of the filter regeneration, and it has been difficult to establish both the characteristics. However, by the present invention, the partition wall thickness and the cell density optimum for the pressure loss and the temperature gradient can be derived.

The internal combustion engine in the first aspect of the present invention is not especially restricted as long as the internal combustion engine contains the PM to be purified in the exhaust gas, but is preferably a diesel engine which contains a large amount of particulate matters. Examples of a means or device for intermittently burning the PM captured by the filter include a means or device for raising the temperature of the filter by a heater, a means or device using a burner, and an exhaust gas temperature raising means or device for raising the exhaust gas temperature, and the means or device is not especially restricted. However, the exhaust gas temperature raising means or device is especially preferable. In this method, there is a tendency that the temperature gradient generated in the filter increases, and the method can be effectively applied to the first aspect of the present invention.

As the exhaust gas temperature raising means or device, the exhaust gas temperature is preferably raised, for example, by an adjustment device which adjusts the supply time of the fuel to the internal combustion engine. For example, in the internal combustion engine including a fuel injection device, the fuel injection time can be comparatively easily changed. When the PM in the filter reaches a predetermined amount, the injection time of the fuel can be changed to raise the exhaust gas temperature. An injection device which injects a part of the fuel is also preferably disposed in the exhaust pipe, accordingly the burning occurs in the exhaust pipe, and the exhaust gas temperature can be raised.

The exhaust emission control system of the first aspect of the present invention preferably includes a means or device which lowers the burning temperature of the PM deposited on the filter in that the burning can be easily performed, and the exhaust gas temperature raising means or device is especially preferably combined and used. This is because the exhaust gas temperature raising means or device does not easily raise the temperature at a high temperature as compared with the combustion means or device of the PM by the heater or the like, and it is therefore effective to lower the burning temperature. As the means or device which lowers the burning temperature, for example, an auxiliary agent adding device or the like is preferable, accordingly an auxiliary agent can be added into the fuel quantitatively. When the fuel is burnt in a cylinder, the added auxiliary agent is taken into the PM, and captured in the DPF, and the burning temperature of the PM can be lowered by a catalytic function of the auxiliary agent. In the first aspect of the present invention, the means or device which lowers the burning temperature of the PM is not restricted to only the auxiliary agent adding device, and may include any means or device that lowers the burning temperature.

Moreover, the exhaust emission control system of the first aspect of the present invention preferably includes a means, matter, or device which promotes the burning of the PM in that the burning can be easily performed. The means, matter, or device which promotes the burning of the PM is not especially restricted, and may include any promoting means, matter, or device. However, for example, it is preferable to apply the catalysts which promote the burning of the PM, such as Pt, Pd, and Rh, to the filter.

In the first aspect of the present invention, materials constituting the filter are not especially restricted, but various ceramic materials containing oxide or non-oxide as a main component are preferable from viewpoints of strength, heat resistance, and durability. Concrete examples are considered to include cordierite, mullite, alumina, spinel, silicon carbide, silicon nitride, lithium aluminum silicate, aluminum titanate, and the like. One or two or more selected from them are preferably used as the main components, and especially cordierite, silicon carbide, or a silicon-silicon carbide based material is preferable. Here, the "main component" means that the component constitutes 50% by mass or more, preferably 70% by mass or more, further preferably 80% by mass or more of the filter.

In the first aspect of the present invention, the filter is preferably a filter in which a plurality of segments are integrated, or a filter including slits. When the filter is divided into a plurality of segments, and the segments are integrated, or the slits are formed in the filter, a thermal stress is scattered, and cracks by the thermal stress can be prevented. When the filter is segmented and integrated, a size or shape of each segment is not restricted. However, when each segment is excessively large, an effect of preventing the cracks by segmentation is not sufficiently fulfilled. When the segment is excessively small, the manufacturing of the respective segments or the integrating thereof by bonding unfavorably becomes complicated. In a preferable size of the segment, a sectional area is 900 to 10000 mm², further preferably 900 to 5000 mm², and most preferably 900 to 3600 mm2, and 70% by volume or more of the filter is preferably constituted of the honeycomb segment having this size. In a preferable shape of the segment, for example, a quadrangular sectional shape, that is, the segment having a square pole shape is regarded as a basic shape, and the shape of the segment on an outer peripheral side can be appropriately selected in accordance with the shape of the integrated filter. The whole sectional shape of the filter is not especially restricted, and is not limited to a circular shape shown in FIG. 2(a), and, for example, in addition to an elliptic shape, a race track shape, a substantially circular shape such as an oblong shape, a quadrangular shape, and a polygonal shape such as a hexagonal shape may also be used.

The partition walls of the filter in the first aspect of the present invention are porous, but a pore diameter and a porosity of the partition wall are not especially restricted, and can be appropriately selected in accordance with the application by any person skilled in the art. In general, the pore diameter can be selected in accordance with a particle diameter of the PM or the like. For example, when the partition walls are used in the DPF, the average pore diameter is preferably set to about 5 to 70 μm, further preferably about 10 to 50 μm, especially preferably about 15 to 30 μm. The porosity can be similarly appropriately selected in accordance with the application. When the porosity is excessively small, an initial pressure loss is excessively large. When the porosity is excessively large, strength unfavorably becomes insufficient. For example, the preferable porosity for use in the DPF is in a range of 30 to 90%. When the porosity is less than 30%, the pressure loss becomes excessively large. When the porosity exceeds 90%, the strength of the ceramic material runs short. The thermal conductivity of the filter is not especially restricted, but is preferably 8 to 70 W/mK, further preferably 10 to 55 W/mK.

The method of manufacturing the filter is not especially restricted, but the filter can be manufactured, for example, by the following method.

A material selected from the above-described preferable materials, for example, a silicon carbide powder is used as a raw material powder of the filter, binders such as methyl cellulose and hydroxypropoxyl methyl cellulose are added to the powder, and further surfactant and water are added to obtain plastic clay. Moreover, for example, the partition wall thickness and the cell density in the appropriate ranges are determined according to the third aspect of the present invention, an extruder including a ferrule which forms the shape is used, the obtained clay is extrusion-molded, and accordingly a molded article having a honeycomb structure is obtained. This article is dried, for example, by microwaves and hot air, and thereafter one-end portions of adjacent through channels on opposite sides are plugged with a material similar to that used in manufacturing the filter. The article is further dried, heated/degreased, for example, in a nitrogen atmosphere, and thereafter calcined in an inactive atmosphere such as argon so that the filter can be obtained. A calcining temperature and a calcining atmosphere differ with the raw material, and any person skilled in the art can select the calcining temperature and calcining atmosphere which are appropriate for the selected ceramic raw material.

To form the filter into a constitution in which a plurality of segments are integrated, after obtaining the segments in the above-described method, the obtained segments are bonded, for example, using ceramic cement, and dried/hardened so that the filter can be obtained. A method of imparting the catalyst to the filter manufactured in this manner may be a method usually performed by the person skilled in the art. For example, when a catalyst slurry is wash-coated, dried, and calcined, the catalyst can be supported.

The present invention will be described hereinafter concretely in accordance with examples, but the present invention is not limited to any of these examples.

EXAMPLES AND COMPARATIVE EXAMPLES

Next, the present invention will be described further concretely based on the examples.

Example 1

Figure 8:
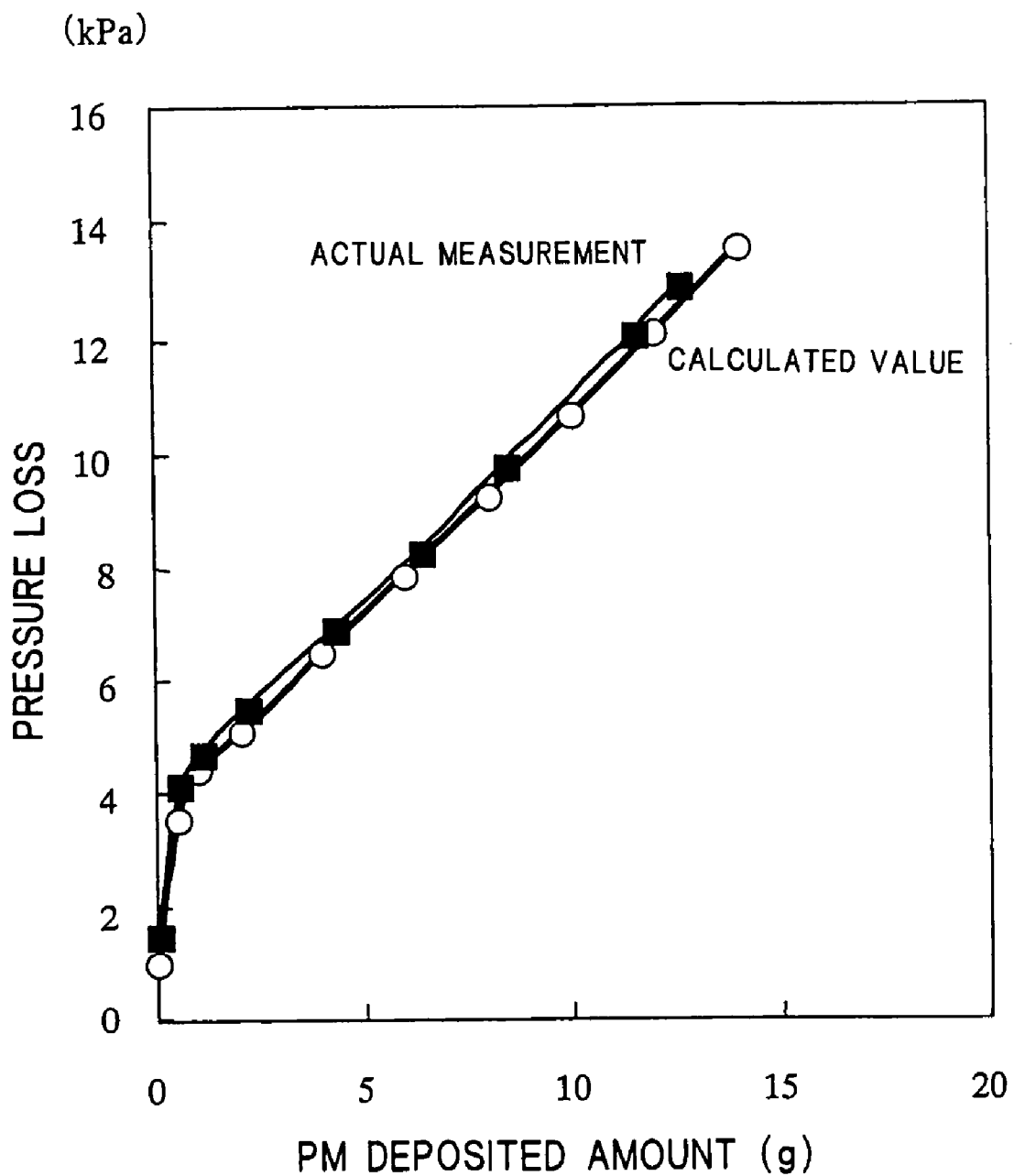
FIG. 8 is a graph in which the results obtained by the method of calculating the pressure loss according to the present invention are compared with actual measurement.

A filter having the same characteristics as those of Filter A used in the description of the second aspect of the present invention and having a cell density of 46.5 cells/cm², and a partition wall thickness of 305 μm was prepared. The filter was attached to a diesel engine in a constitution shown in FIG. 3, a relation between a deposited amount of PM and a pressure loss was actually measured on conditions of a gas amount of 2.27 Nm³/min. and an inflow gas temperature at 200° C., and actual measurement was compared with a calculated value calculated using Equation (8). Results are shown in FIG. 8, and the actual measurement matched the calculated value very well.

Examples 2 to 6 and Comparative Examples 1, 2

Figure 9:
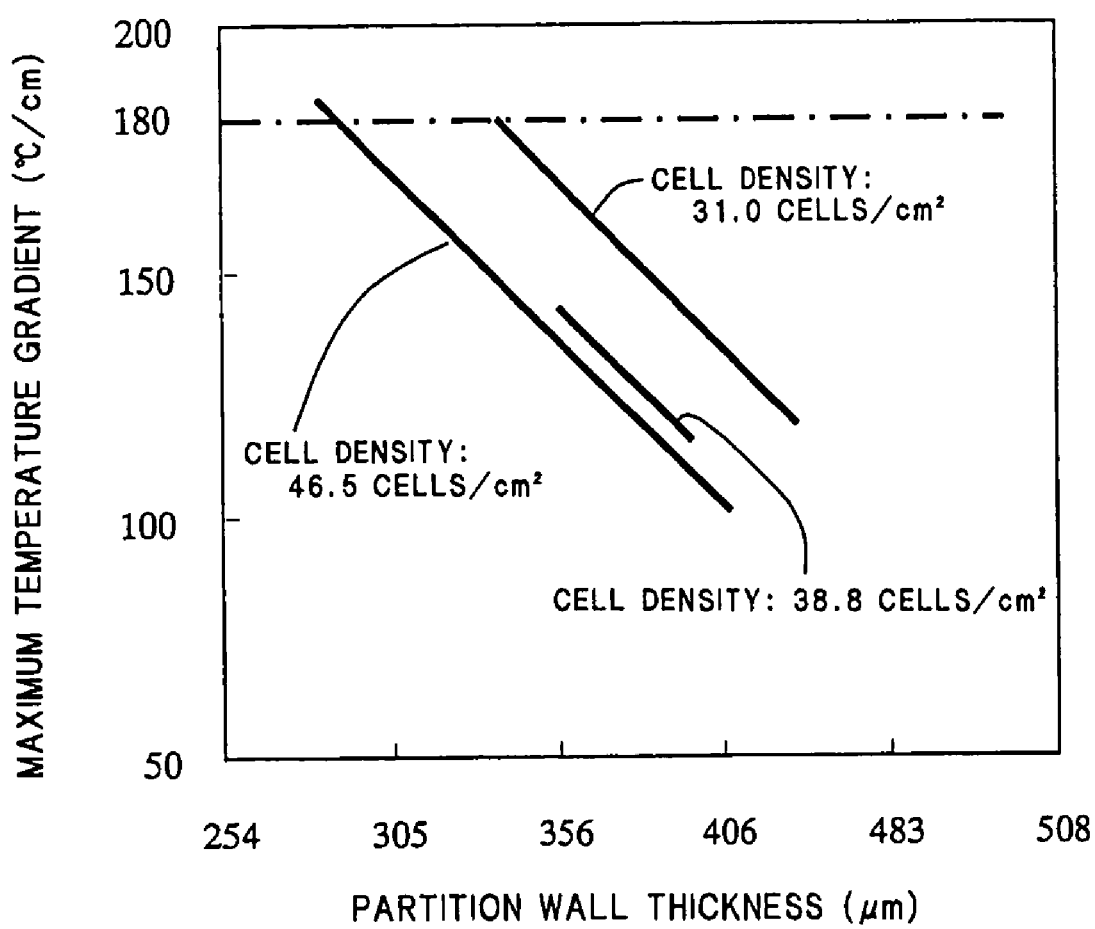
FIG. 9 is a graph showing results of measurement of a temperature gradient of the filter in an example.

Filters having the same filter characteristics as those of Filter A and having cell densities and partition wall thicknesses shown in Table 1 were prepared. The filter was attached to a system including a 2.0 liter diesel engine and an auxiliary agent adding device in a basic constitution shown in FIG. 3 to constitute an exhaust emission control system. The auxiliary agent adding device was used, 25 ppm of a Ce fuel auxiliary agent was added to fuel, and the system was operated. When a PM deposited amount per unit filter volume reached 6 kg/m³, the exhaust gas temperature was raised at 600° C. to burn the PM, regeneration of the filter was evaluated, and a maximum temperature gradient in each segment was measured. Results are shown in Table 1 and FIG. 9.

TABLE 1

| | Partition wall thickness μ mil indicated within ( ) | Cell density, cells/cm² cells/in² indicated within ( ) | Maximum temperature gradient in segment ° C./cm | Pressure loss, kPa |
|---|---|---|---|---|
| Example 2 | 305 (12) | 46.5 (300) | 170 | 70.7 |
| Example 3 | 381 (15) | 46.5 (300) | 130 | 79.9 |
| Example 4 | 381 (15) | 38.8 (250) | 125 | 78.8 |
| Example 5 | 381 (15) | 31.0 (200) | 144 | 80.4 |

TABLE 1-continued

| | Partition wall thickness μ mil indicated within ( ) | Cell density, cells/cm² cells/in² indicated within ( ) | Maximum temperature gradient in segment ° C./cm | Pressure loss, kPa |
|---|---|---|---|---|
| Example 6 | 368 (14.5) | 38.8 (250) | 131 | 77.4 |
| Comparative Example 1 | 457 (18) | 46.5 (300) | 78 | 91.7 |
| Comparative Example 2 | 254 (10) | 46.5 (300) | 210 (cracks generated in DPF) | 65.6 |

Regeneration test:
DPF shape: φ5.66"×6"L
Soot deposited amount: 6 g/L

Pressure Loss Calculation/Actual Measurement Conditions:
DPF shape: φ5.66"×10"L

PM deposited amount: 5 g/L

Gas amount: 10 NM3/min.
Gas temperature: 665° C.

From the results, it is seen that the larger the partition wall thickness is, a thermal capacity increases, therefore a maximum temperature in the filter at the time of regeneration drops, and additionally a temperature gradient in the filter is reduced. It is also seen that the larger the cell density is, the thermal capacity increases, and the temperature gradient in the segment is also reduced. A temperature gradient at the time of the filter regeneration, at which any crack was not generated, was 180° C./cm.

Values of the pressure loss calculated using Equation (8) based on the filter shape and characteristics are shown in Table 1. The maximum temperature gradients and pressure losses of samples of Examples 2 to 6 fell in satisfactory ranges, but the pressure loss of the sample of Comparative Example 1 was excessively large, the maximum temperature gradient of the sample of Comparative Example 2 was excessively large, and the filters were cracked.

INDUSTRIAL APPLICABILITY

As described above, according to a first aspect of the present invention, an exhaust emission control system is a satisfactory system in which a pressure loss at the time of PM deposition is small, a maximum temperature gradient in a filter at the time of filter regeneration by PM burning is small, and the filter is not easily cracked. In a value obtained by a method of calculating a pressure loss according to a second aspect of the present invention, satisfactory agreement with actual measurement is seen, and the pressure loss can be measured with good accuracy. According to a third aspect of the present invention, a filter which falls in the scope of the first aspect of the present invention can be easily prepared according to a third aspect of the present invention.

The invention claimed is:

1. An exhaust emission control system comprising: an internal combustion engine; a filter for capturing particulate matters in an exhaust gas exhausted from the internal combustion engine; and an exhaust pipe for introducing the exhaust gas into the filter, the system comprising combustion means for intermittently burning the particulate matters captured by the filter, the filter being a honeycomb filter including: at least two end faces; porous partition walls extending from one end face to the other end face; and a large number of through channels partitioned by the partition walls and extending from one end face through the other end face, predetermined through channels being sealed in one end face, remaining predetermined through channels being sealed in the other end face, wherein assuming that a partition wall thickness is (X) μm, and the number of through channels per unit area in a section vertical to a longitudinal direction of the through channels is (Y) cells/cm², X and Y fall within a range surrounded by straight lines connecting points A3 (X is 330, Y is 42.7), B3 (X is 356, Y is 34.9), C3 (X is 406, Y is 34.9), and D3 (X is 381, Y is 42.7) in this order wherein the filter has a combination of X and Y that keeps a temperature gradient below 180° C./cm at a time of filter regeneration to prevent cracks from being generated.

2. The exhaust emission control system according to claim 1, wherein the internal combustion engine is a diesel engine.

3. The exhaust emission control system according to claim 1, further comprising: means for lowering the burning temperature of the particulate matters captured by the filter.

4. The exhaust emission control system according to claim 1, further comprising: means for promoting the burning of the particulate matters captured by the filter.

5. The exhaust emission control system according to claim 1, wherein the filter contains a ceramic material as a main component.

6. The exhaust emission control system according to claim 1, wherein the filter is constituted by integration of a plurality of segments of a honeycomb structure.

7. The exhaust emission control system according to claim 1, wherein the combustion means includes exhaust gas temperature raising means for raising a temperature of the exhaust gas in such a manner as to start the burning of the particulate matters captured by the filter.

8. The exhaust emission control system according to claim 7, wherein the exhaust gas temperature raising means includes an adjustment device for adjusting a time to supply fuel to the internal combustion engine.

9. The exhaust emission control system according to claim 7, wherein the exhaust gas temperature raising means includes a supply device for supplying the fuel into the exhaust pipe.

10. A method of calculating a pressure loss of a honeycomb filter including: at least two end faces; porous partition walls extending from one end face to the other end face; and a large number of through channels partitioned by the partition walls and extending from one end face through the other end face, predetermined through channels being plugged in one end face, remaining predetermined through channels being plugged in the other end face, the method comprising the steps of: decomposing the pressure loss into at least a pressure loss in a plugged portion, a pressure loss in the through channel, and a pressure loss in the partition wall; and decomposing the pressure loss in the partition wall into pressure losses in cases where any particulate matter is not deposited in the filter and where the particulate matters are deposited to calculate the pressure loss.

11. A method of manufacturing a filter, wherein a shape of the filter is determined by use of a pressure loss value obtained by the calculation method according to claim 10.

12. The method of calculating the pressure loss according to claim 10, further comprising the steps of measuring the pressure loss in the case where the particulate matters are deposited in the predetermined filter; and calculating the pressure loss in the partition wall in the case where the particulate matters are deposited in the filter based on an equation obtained by curve fitting of an increase behavior of the obtained pressure loss.

13. A method of manufacturing a filter, wherein a shape of the filter is determined by use of a pressure loss value obtained by the calculation method according to claim 12.

14. An exhaust emission control system comprising: an internal combustion engine; a filter for capturing particulate matters in an exhaust gas exhausted from the internal combustion engine; and an exhaust pipe for introducing the exhaust gas into the filter, the system comprising a combustion device for intermittently burning the particulate matters captured by the filter, the filter being a honeycomb filter including: at least two end faces; porous partition walls extending from one end face to the other end face; and a large number of through channels partitioned by the partition walls and extending from one end face through the other end face, predetermined through channels being sealed in one end face, remaining predetermined through channels being sealed in the other end face, wherein assuming that a partition wall thickness is (X) μm, and the number of through channels per unit area in a section vertical to a longitudinal direction of the through channels is (Y) cells/cm$^2$, X and Y fall within a range surrounded by straight lines connecting points A3 (X is 330, Y is 42.7), B3 (X is 356, Y is 34.9), C3 (X is 406, Y is 34.9), and D3 (X is 381, Y is 42.7) in this order wherein the filter has a combination of X and Y that keeps a temperature gradient below 180° C./cm at a time of filter regeneration to prevent cracks from being generated.

* * * * *